United States Patent [19]

Appelqvist et al.

[11] Patent Number: 5,593,716
[45] Date of Patent: Jan. 14, 1997

[54] FOOD PRODUCT

[75] Inventors: Ingrid A. Appelqvist, Northampton; Charles R. Brown, Bedford; Ian T. Norton, Northampton, all of United Kingdom

[73] Assignee: Van den Bergh Foods Co. Division of Conopco, Inc., Lisle, Ill.

[21] Appl. No.: 501,820

[22] Filed: Jul. 14, 1995

[30] Foreign Application Priority Data

Jul. 15, 1994 [EP] European Pat. Off. ............ 94305213

[51] Int. Cl.⁶ ................................. A23L 1/05; A23L 1/39
[52] U.S. Cl. ........................ 426/589; 426/601; 426/603
[58] Field of Search ...................... 426/589, 601, 426/603

[56] References Cited

U.S. PATENT DOCUMENTS

| | | | |
|---|---|---|---|
| 4,720,390 | 1/1988 | Bächler et al. | 426/589 |
| 5,011,701 | 4/1991 | Baer et al. | 426/589 |
| 5,137,742 | 8/1992 | Bakal et al. | 426/589 |
| 5,153,020 | 10/1992 | Singer | 426/589 |
| 5,158,798 | 10/1992 | Fung et al. | 426/589 |
| 5,324,531 | 6/1994 | Hoefler et al. | 426/589 |
| 5,360,624 | 11/1994 | Okura et al. | 426/589 |

FOREIGN PATENT DOCUMENTS

| | | |
|---|---|---|
| 355908 | 2/1990 | European Pat. Off. . |
| 432835 | 6/1991 | European Pat. Off. . |
| 558113 | 9/1993 | European Pat. Off. . |
| 602991 | 6/1994 | European Pat. Off. . |
| 63-251051 | 10/1988 | Japan . |
| 01277460 | 11/1989 | Japan . |

Primary Examiner—Jeanette Hunter
Attorney, Agent, or Firm—Gerard J. McGowan, Jr.

[57] ABSTRACT

A liquid sauce, soup or gravy product having high temperature, shear and storage stability and having a smooth texture comprising an aqueous phase and an oil phase. The aqueous phase includes;

(a) a dispersed phase of non-starch polysaccharide microgel; and
(b) a continuous phase comprising a biopolymer solution.

9 Claims, No Drawings

FOOD PRODUCT

FIELD OF THE INVENTION

The present invention relates to a liquid sauce, soup or gravy product having high temperature, shear and storage stability and having a smooth texture.

BACKGROUND TO THE INVENTION

Traditional chef sauces, soups and gravies are based on starch as a thickening agent. Within the process of preparation, the starch grains are swollen and allowed to interact. With such chef sauces, the sauce is used shortly after preparation and therefore the natural starches used cause no problems.

However, in manufactured sauces the starch has to survive extremes in terms of processing (ie. high temperatures and high shear) and then remain stable (no loss of smoothness etc.) for long periods of storage time. Storage may be under frozen, chill or ambient conditions. The sauce, soup or gravy then needs to be stable on re-heating for consumption. Because of these requirements manufactured sauces use chemically modified (cross-linked and derivatised) starches.

The use of such modified starches causes a number of problems and concerns such as;

(a) they give a starchy taste and texture, probably due to some (limited) retrogradation on storage;

(b) they are seen by consumers as chemicals; and (c) the final sauces are not as smooth as home-made sauces. This is probably due to limited swelling or retrogradation of the starch polymers which results in hard included particles.

It is therefore desirable to be able to replace the modified starch thickening agent in sauces, soups and gravies.

We have now found that the starch granules may be replaced by non-starch polysaccharide microgel. This microgel has none of the problems associated with granular starch allowing a liquid sauce, soup or gravy product to be provided which has a high temperature, shear and storage stability and has a smooth texture.

Furthermore sauces manufactured using the microgel system disclosed below have the following advantages;

(a) the sauce has the same breakdown properties (ie perception of thickness on eating) as a starch-containing system.

(b) the sauce has improved taste properties, having an excellent creamy taste with no starch off-flavour.

(c) the sauce has a glossy appearance; and (d) the sauce has a smooth, non-slimy texture.

DESCRIPTION OF THE INVENTION

Accordingly the invention provides a liquid sauce, soup or gravy product comprising an aqueous phase and an oil phase characterised in that the aqueous phase includes (a) a dispersed phase of non-starch polysaccharide microgel; and (b) a continuous phase comprising a biopolymer solution.

Non-Starch Polysaccharide Microgel

The non-starch polysaccharide microgel is prepared according to one of the 2 processes disclosed in EP 432 835 and EP 355 908. In these processes a liquid containing a dissolved polymeric gelling agent is thermally or chemically set, whilst subjecting the liquid to sufficient shear to obtain a substantially less rigid composition than would have been obtained by chemically setting the liquid under quiescent conditions.

The term thermoreversible microgel refers to non-starch polysaccharide microgels which melt upon heating and which re-take their gel structure upon cooling. Examples of thermoreversible microgels of polysaccharides are disclosed in EP 355 908.

The term chemically set microgels refers to non-starch polysaccharide microgels which do not reversibly melt upon increasing the temperature. They derive their gel structure from a chemical interaction of the polysaccharide with appropriate ions, for example, $Ca^{2+}$ ions. Examples of chemically set microgels of polysaccharides are disclosed in EP 432 835.

The non-starch polysaccharide microgel so prepared needs to be stable on storage and at temperatures appropriate to the handling and consumption of the sauce, soup or gravy. Thus the melting temperature of the gel that forms the basis of the non-starch polysaccharide microgel is preferably above 70° C. Accordingly, suitable gelling agents may be selected from alginate or any edible derivative thereof; agar; calcium pectin; iota carrageenan; kappa carrageenan; gellan; furcelleran; and mixtures thereof.

The processes given above and disclosed in more detail in EP 432 835 and EP 355 908 provide non-starch polysaccharide microgels having substantially no free water. In order to manufacture the sauce, soup or gravy product according to the invention, the non-starch polysaccharide microgel dispersion is diluted to the preferred viscosity. The viscosity is selected according to the desired thickness of the final sauce. The preferred viscosity in the aqueous phase is from 0.2 to 3.5 Pas. The preferred final sauce viscosity values, measured by Bohlin VOR or Haake Roto visco RV20 rheometers at 60° C. and 50 sec⁻ using a concentric geometry are 0.2 Pas to 5 Pas, more preferred is 0.5 Pas to 2.0 Pas, most preferred is 1.0 to 1.5 Pas.

The Aqueous Phase

The aqueous phase preferably comprises (a) from 50 to 80%, most preferably approximately 70%, by weight of the aqueous phase non-starch polysaccharide microgel; and (b) from 0.3 to 15% by weight of the aqueous phase continuous phase biopolymer.

The biopolymer in the continuous phase is selected from gelatin; carrageenan; agar; pectin; alginate; solubilised starch; starch hydrolysis product (SHP); exudate gums, for example Gum Arabic, Karaya and tragacanth; Galactomannans, for example Guar Gum, and Locust Bean Gum; Bacterial exopolysaccharides, for example Xanthan and Gellan; and mixtures thereof.

Preferably the biopolymer in the continuous phase is selected from gelatin, carrageenan, agar, pectin, alginate and mixtures thereof.

The aqueous phase may optionally comprise additional ingredients such as milk proteins; oil-in-water promoting emulsifiers, for example sodium caseinate; culinary products such as herbs, spices, salt and pepper, vegetable pieces, colourings, flavourings.

The Oil Phase

The oil phase comprises an edible oil, such as a vegetable oil, for example sunflower oil, olive oil; an emulsion, for example cream, butter, yellow fat spread; or mixtures thereof.

The sauce, soup or gravy product comprises from 0.6 to 25 wt % by weight of the final product, preferably 3 to 20 wt %, most preferably 5 to 15 wt % oil phase.

General Process for Preparation

The continuous phase biopolymer is dispersed in water and any optional additional ingredients of the aqueous phase added. This mixture is then heated with stirring such that the biopolymer is fully solubilised. The non-starch polysaccharide microgels are then added to the biopolymer solution, the biopolymer solution being at a temperature not higher than the thermal stability limit of the non-starch polysaccharide microgel. The thus prepared aqueous phase is added with stirring to the oil phase. The product is then subjected to shearing such that intimate mixing and the required oil droplet size (substantially less than 20 μm, preferably less than 10 μm) is achieved.

The temperature at which the prepared aqueous phase is added to the oil phase is the lower of the temperature of the thermal stability of the non-starch polysaccharide microgel and the temperature of the thermal stability of any emulsion.

Alternatively the aqueous phase may be prepared in a single step process.

EXAMPLES OF SUCH A SINGLE STEP PROCESS ARE;

(a) one or more gelling agent is present in the liquid composition for preparation of the non-starch polysaccharide microgel and the conditions of the setting are such that one gelling agent forms a non-starch polysaccharide microgel in a solution of the remaining gelling agents; and (b) one or more gelling agent is present in the liquid composition for preparation of the non-starch polysaccharide microgel and the conditions of the setting are such that all gelling agents form a non-starch polysaccharide microgel, at least one gelling agent being chosen such that on reheating to the sauce serving temperature (60° C.), the so chosen gelling agent melts to form a continuous solution.

EXAMPLES

Example 1

A white sauce having the formulation shown in Table 1 was prepared as follows;

TABLE 1

| Ingredient | Amount (% w/w on product) |
| --- | --- |
| Continuous aqueous phase | |
| Gelatin | 4.00 |
| Sodium caseinate | 0.50 |
| Duchi B Alt flavour | 1.00 |
| Deionised water | 40.40 |
| Seasoning to taste | — |
| Disperse aqueous phase | |
| Sodium alginate | 0.808 |
| Calcium chloride | 0.08 |
| Potassium sorbate | 0.052 |
| Deionised water | 38.16 |
| Oil Phase | |
| Sunflower oil | 15.00 |

A batch size of 500 g was prepared.

Preparation of the Continuous Aqueous Phase

A continuous aqueous phase was prepared by dispersing 20 g gelatin in cold (25° C.) deionised water (200 g) together with 2.5 g sodium caseinate and 5.0 g Duchi B Alt flavour using a Silverson laboratory mixer fitted with tubular attachments (1.9 cm od). The gelatin dispersion was heated to 95° C. with continuous stirring to allow the caseinate to solubilise. The solution was then cooled to 60° C..

Preparation of the Dispersed Aqueous Phase 2.0% w/w sodium alginate (Manugel DMB, Kelco) and 1.32% w/w calcium chloride solution, both at 95° C., were combined via a proportioning pump into a scraped surface heat exchanger line comprising 2 high speed A-units and 2 standard A-units connected in series. The jacket temperatures were set to −15, −5, 0 and 0° C. respectively and the rotor speeds set to 4000 rpm for the HSA and 1000 rpm for the standard A-units.

With stock pump settings of 85% for alginate and 15% for $CaCl_2$, a fine gel particle conversion factor of 90% and alginate concentration of 1.70% w/w was achieved. Throughput was 50 g. min$^{-1}$.

The resultant non-starch polysaccharide microgel dispersion was heated to 60° C. and combined with the continuous aqueous phase in a volume to weight ratio of 1 to 1.14 with gentle mixing. This procedure produced an effective phase volume of microgel on total aqueous phase of about 0.50.

The aqueous phase was added to sunflower oil (75.0 g) and mixed for 3 minutes at 95° C. using a Silverson Laboratory mixer at its maximum rpm. The sauce was cooled to 45° C. and then acidified from pH 6.5 to pH 5.5 using 1.2 ml white wine vinegar. Finally the sauce was sealed in 250 g sachets and frozen at −18° C.

Example 2

Example 1 was repeated but with the continuous aqueous phase containing 5.5% amylopectin (Amioca) rather than gelatin.

Example 3

A white sauce having the formulation shown in Table 2 was prepared as follows;

TABLE 2

| Ingredient | Amount (% w/w on product) |
| --- | --- |
| Continuous aqueous phase | |
| Iota carrageenan | 1.00 |
| Sodium caseinate | 0.50 |
| Duchi B ALT flavour | 1.00 |
| Deionised water | 39.50 |
| Disperse aqueous phase | |
| Agar (Luxara 1253 Branwell, UK) | 0.86 |
| Potassium sorbate | 0.056 |
| De-ionised water | 42.084 |
| Oil Phase | |
| Sunflower oil | 15.00 |

Preparation of the Continuous Aqueous Phase

A continuous aqueous phase was prepared by dispersing iota-carrageenan (5.0 g) in cold (25° C.) deionised water (197.5 g) together with 2.5 g sodium caseinate and 5.0 g Duchi B Alt using a Silverson Laboratory mixer fitted with tubular attachments (1.9 cm od). The iota-carrageenan dispersion was heated to 95° C. with continuous stirring to allow the caseinate to solubilise. The solution was then cooled to 60° C.

Preparation of the Dispersed Aqueous Phase

Agar (1.75% w/w on water) and potassium sorbate (0.2% w/w on water) were dissolved in water at 95° C. with stirring. The solution was pumped directly to the microvotator line of Example 1 with jacket temperatures set to +5,+5,+10, +10° C. respectively. Throughput was 56 g/min. The agar solution temperature was kept above 65° C. up until the inlet of the first A-unit.

The resultant non-starch polysaccharide microgel dispersion was combined with the continuous aqueous phase in a volume to weight ratio of 1:1.02. The aqueous phase was then added to sunflower oil again as detailed in Example 1.

The sauces prepared in Examples 1 to 3 on thawing and reheating were excellent, having a smooth appearance and texture with excellent mouthfeel and breakdown properties.

Example 4

TABLE 3

| Ingredient | Amount (% w/w on product) |
|---|---|
| Continuous aqueous phase | |
| Guar gum | 0.70 |
| Sodium Caseinate | 0.50 |
| Duchi B Alt flavour | 1.00 |
| Deionised water | 43.70 |
| Disperse aqueous phase | |
| Sodium alginate | 0.808 |
| Calcium chloride | 0.080 |
| Potassium sorbate | 0.052 |
| Deionised water | 38.160 |
| Oil phase | |
| Sunflower oil | 15.00 |

Preparation of the Continuous Aqueous Phase

A continuous aqueous phase was prepared by dispersing guar gum (3.5 g) in cold deionised water (218.5 g) at 25° C. together with 2.5 g sodium caseinate and 5.0 g Duchi B Alt using a Silverson laboratory mixer fitted with tubular attachments (1.9 cm o.d.). The guar gum dispersion was heated to 95° C. with continuous stirring to allow the caseinate to solubilise. The solution was then cooled to 60° C.

Preparation of the Dispersed Aqueous Phase

A microgel dispersion was prepared as detailed in Example 1.

The resultant non-starch microgel dispersion was heated to 60° C. and combined with the continuous aqueous phase in a volume to weight ratio of 1:1.17 with gentle mixing.

We claim:

1. A liquid sauce, soup or gravy product comprising an aqueous phase and an oil phase wherein the aqueous phase comprises:

(a) from 50 to 80% by weight of the aqueous phase of a dispersed phase of non-starch polysaccharide microgel made from a chemically-or thermally-setting gelling polysaccharide; and (b) from 0.3 to 15% by weight of the aqueous phase of continuous phase biopolymer.

2. The liquid sauce, soup or gravy product according to claim 1 wherein the non-starch polysaccharide microgel is made from a gelling polysaccharide selected from the group consisting of alginate or any edible derivative; agar; calcium pectin; iota carrageenan; kappa carrageenan; gellan; furcelleran; and mixtures thereof.

3. A liquid sauce, soup or gravy product according to claim 1 wherein the biopolymer in the continuous phase is selected from the group consisting of gelatin; carrageenan; agar; pectin; alginate; solubilised starch; starch hydrolysis product; Exudate gums, for example Gum Arabic, Karaya, tragacanth; Galactomannans, for example Guar gum and Locust Bean gum; Bacterial exopolysaccharides, for example xanthan and gellan; and mixtures thereof.

4. A liquid sauce, soup or gravy product according to claim 1 wherein the biopolymer in the continuous phase is selected from the group consisting of gelatin, carrageenan, agar, pectin, alginate and mixtures thereof.

5. A liquid sauce, soup or gravy product according to claim 1 wherein the oil phase comprises an edible oil; an emulsion, or mixtures thereof.

6. A liquid sauce, soup or gravy product according to claim 1 wherein the product comprises from 0.6 to 25 wt % by weight of the total product oil phase.

7. A liquid sauce, soup or gravy product according to claim 1 wherein the product comprises from 3 to 20% by weight of the total product oil phase.

8. A liquid sauce, soup or gravy product according to claim 1 wherein the product comprises from 5 to 15% by weight of the total product oil phase.

9. The liquid sauce according to claim 5 wherein said emulsion is selected from the group consisting of cream, butter and yellow fat spreads.

* * * * *